(12) United States Patent
Lacaze et al.

(10) Patent No.: US 11,169,540 B2
(45) Date of Patent: Nov. 9, 2021

(54) AUTONOMOUS CONVOYS MANEUVERING "DEFORMABLE" TERRAIN AND "DEFORMABLE" OBSTACLES

(71) Applicant: Robotic Research, LLC, Clarksburg, MD (US)

(72) Inventors: Alberto Daniel Lacaze, Potomac, MD (US); Karl Nicholas Murphy, Cocoa Beach, FL (US)

(73) Assignee: ROBOTIC RESEARCH, LLC, Clarksburg, MD (US)

( * ) Notice: Subject to any disclaimer, the term of this patent is extended or adjusted under 35 U.S.C. 154(b) by 204 days.

(21) Appl. No.: 16/406,152

(22) Filed: May 8, 2019

(65) Prior Publication Data
US 2021/0089054 A1 Mar. 25, 2021

(51) Int. Cl.
| | |
|---|---|
| *G05D 1/02* | (2020.01) |
| *G05D 1/00* | (2006.01) |
| *B60W 40/06* | (2012.01) |
| *B60W 40/10* | (2012.01) |
| *G01C 21/36* | (2006.01) |
| *B60W 60/00* | (2020.01) |

(Continued)

(52) U.S. Cl.
CPC ....... *G05D 1/0295* (2013.01); *B60W 30/0956* (2013.01); *B60W 40/06* (2013.01); *B60W 40/10* (2013.01); *B60W 60/0015* (2020.02); *G01C 21/3461* (2013.01); *G01C 21/3691* (2013.01); *G05D 1/0088* (2013.01); *G05D 1/0272* (2013.01); *G08G 1/22* (2013.01); *B60W 2520/10* (2013.01); *G05D 2201/0213* (2013.01)

(58) Field of Classification Search
CPC ...... G08G 1/22; G05D 1/0293; G05D 1/0295; G05D 1/0297; G05D 1/0027; G05D 1/0287; G05D 1/0289; G05D 1/0291; G05D 1/0088; G05D 1/0272; G05D 2201/0213; G01S 2013/9325; B60W 60/0015; B60W 30/0956; B60W 40/06; B60W 40/10; B60W 2520/10; G01C 21/3461; G01C 21/3691
See application file for complete search history.

(56) References Cited

U.S. PATENT DOCUMENTS

| | | | |
|---|---|---|---|
| 6,548,982 B1 | 4/2003 | Papanikolopoulos et al. | |
| 2008/0059007 A1* | 3/2008 | Whittaker | G08G 1/22 701/2 |

(Continued)

FOREIGN PATENT DOCUMENTS

WO  WO-2018007330 A1 * 1/2018 ............. G01C 21/00

*Primary Examiner* — Behrang Badii
(74) *Attorney, Agent, or Firm* — RowanTree Law Group, PLLC; Frederick F. Rosenberger

(57) ABSTRACT

The path of a lead autonomous vehicle moving through "deformable" terrain is shared between the lead autonomous vehicle and the following autonomous vehicles. The lead autonomous vehicle records distances to 3D obstacles and whether to drive through them, and the following autonomous vehicles will classify different "obstacles" that were driven through by the leader and allow the planner to drive through them. In "deformable" terrain, errors in wheel odometry will be recorded by the lead autonomous vehicle and the following autonomous vehicles are informed that similar problems will be encountered. These errors are sensed by discrepancies between odometry and inertial and visual odometry.

6 Claims, 4 Drawing Sheets

(51) Int. Cl.
*B60W 30/095* (2012.01)
*G08G 1/00* (2006.01)
*G01C 21/34* (2006.01)

(56) References Cited

U.S. PATENT DOCUMENTS

| | | | | |
|---|---|---|---|---|
| 2015/0203023 | A1* | 7/2015 | Marti | B60Q 1/503 |
| | | | | 340/425.5 |
| 2015/0253775 | A1 | 9/2015 | Jacobus | |
| 2016/0018228 | A1* | 1/2016 | Parker | G01C 21/3623 |
| | | | | 701/412 |
| 2016/0046021 | A1* | 2/2016 | Wang | G06F 3/04847 |
| | | | | 700/252 |
| 2016/0321381 | A1* | 11/2016 | English | G06F 30/20 |
| 2018/0060459 | A1* | 3/2018 | English | B25J 9/1671 |
| 2018/0126992 | A1* | 5/2018 | Lu | B60W 10/22 |
| 2019/0086916 | A1* | 3/2019 | Choi | G08G 1/09 |
| 2019/0130754 | A1* | 5/2019 | Mueck | G08G 1/163 |
| 2019/0161084 | A1* | 5/2019 | Greenwood | B60W 10/06 |
| 2019/0166338 | A1* | 5/2019 | Greenwood | B60Q 1/48 |

* cited by examiner

AUTONOMOUS CONVOYS MANEUVERING "DEFORMABLE" TERRAIN AND "DEFORMABLE" OBSTACLES

CROSS-REFERENCES TO OTHER APPLICATIONS

Not applicable.

BACKGROUND OF THE INVENTION

1. Field of the Invention

The present invention deals with the presence of "deformable" terrain such as vegetation, weeds, and tree limbs that are in the path of the lead autonomous vehicles as well as the following autonomous vehicles. The path is shared between the lead and follower autonomous vehicles with a lower cost and the lead autonomous vehicle records the distances to 3D obstacles as well as whether it will drive through them. Next, the follower autonomous vehicles classify the different obstacles that are driven through by the leader ("deformable" terrain) and allows the planner to drive through them. In the "deformable terrain", errors in wheel odometry is recorded by the lead autonomous vehicle and the following autonomous vehicles are informed that similar problems will be encountered. These types of errors are sensed by discrepancies between odometry and inertial and visual odometry and the behavior of the following autonomous vehicles may preclude them from creating accelerations that may slip as experienced by the lead autonomous vehicle.

2. Description of Related Art

The statements in this section merely provide background information related to the present disclosure and may not constitute prior art.

There has not been a method developed in the patent literature for establishing a navigation system for the autonomous convoy when the lead autonomous vehicle passes through a "deformable" terrain such as vegetation, weeds, tree limbs, etc.

There has been a patent (U.S. Pat. No. 6,548,982) that describes miniature robotic vehicles that are capable of travelling over all terrain and traversing obstacles of substantial height. This patent describes various embodiments on how the miniature robotic vehicles are able to traverse obstacles in front of them. In this patent, it is not mentioned anywhere about establishing a communication system between a lead autonomous vehicle and following autonomous vehicles based on the terrain and obstacles traversed by the lead autonomous vehicle. This system describes only about a single miniature robotic vehicle and not about a series of robotic vehicles following one another.

There has been an all weather autonomously driven vehicle that has been developed as shown in U.S. Pat. Application No. 2015/0253775. In this case, an on-board vehicle sensor has a beam with a diameter that is only intermittently blocked by rain, snow, dust, or other obscurant particles. This allows an obstacle detection processor to tell the difference between obstacles, terrain variations, and obscurant particles which enables vehicle driving control unit to avoid the presence of obscurant particles along the route taken by the vehicle. The sensor is a LADAR or a RADAR system or a video camera. It is worth noting that in this type of vehicle, there is no navigation system between autonomous vehicles traversing deformable obstacles and no method of recording of distances and errors in wheel odometry.

There has been very little patent literature on traversing obstacles and terrain and none of the ones in the literature deal with "deformable" terrain that are obstacles and the actual navigation of the convoy across the "deformable" terrain. The present invention deals with the process by which the entire autonomous convoy can traverse across "deformable" terrain that the lead autonomous vehicle drove through.

SUMMARY OF THE INVENTION

The lead autonomous vehicle records distances to 3D obstacles that are "deformable" terrain such as vegetation, weeds, tree limbs, and other harmless objects that will not destroy the autonomous vehicle and decides whether to drive through them. The following autonomous vehicles in the convoy classifies the different "obstacles" that were driven through by the lead autonomous vehicle and allows the planner to drive through them.

The errors in wheel odometry will be recorded by the lead autonomous vehicle in "deformable" terrain. The following autonomous vehicles are then informed that similar problems will be encountered. The errors are sensed by discrepancies between odometry and inertial and visual odometry.

The behavior of the followers may preclude them from creating accelerations that may slip as experienced by the leader. A method for sharing navigation errors due to terrain slippage will be used between the lead autonomous vehicle and the following autonomous vehicles in the convoy and to feed-forward the predicted odometry errors of the followers and improve overall localization.

In addition, the following autonomous vehicles must be capable of not only traversing through the "deformable" terrain driven through by the lead autonomous vehicles, but also to avoid new "obstacles" encountered by the lead autonomous vehicles. These "new" obstacles are the non-deformable objects that are not traversed through by the lead autonomous vehicle.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

(non-deformable). The following autonomous vehicle (403) follows the same path as the lead autonomous vehicle.

DETAILED DESCRIPTION OF THE INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Figure 1:
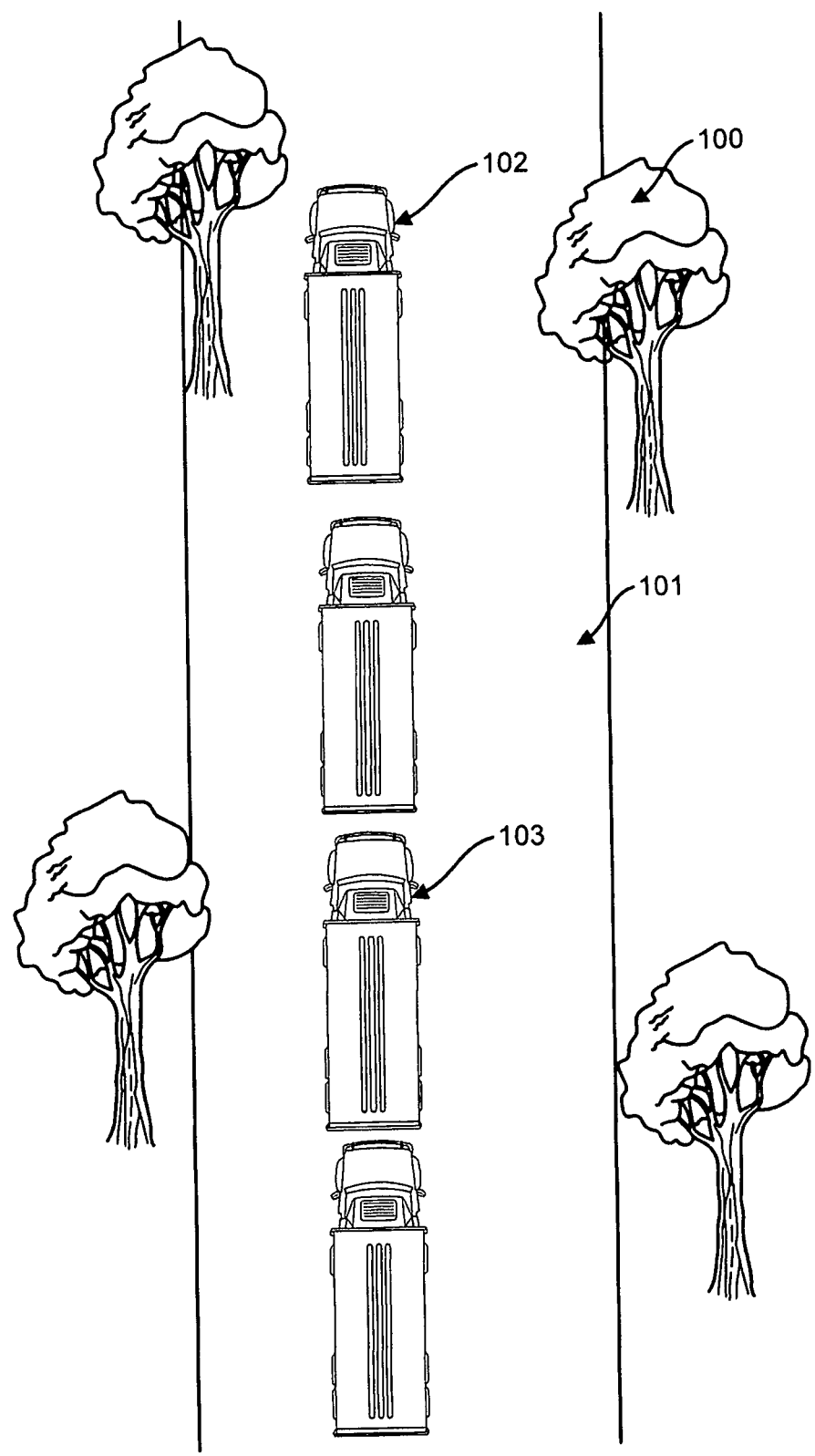
FIG. 1. A lead autonomous vehicle (102) and following autonomous vehicle (103) traversing through "deformable" terrain such as tree limbs (100) in the road network (101).
Figure 2:
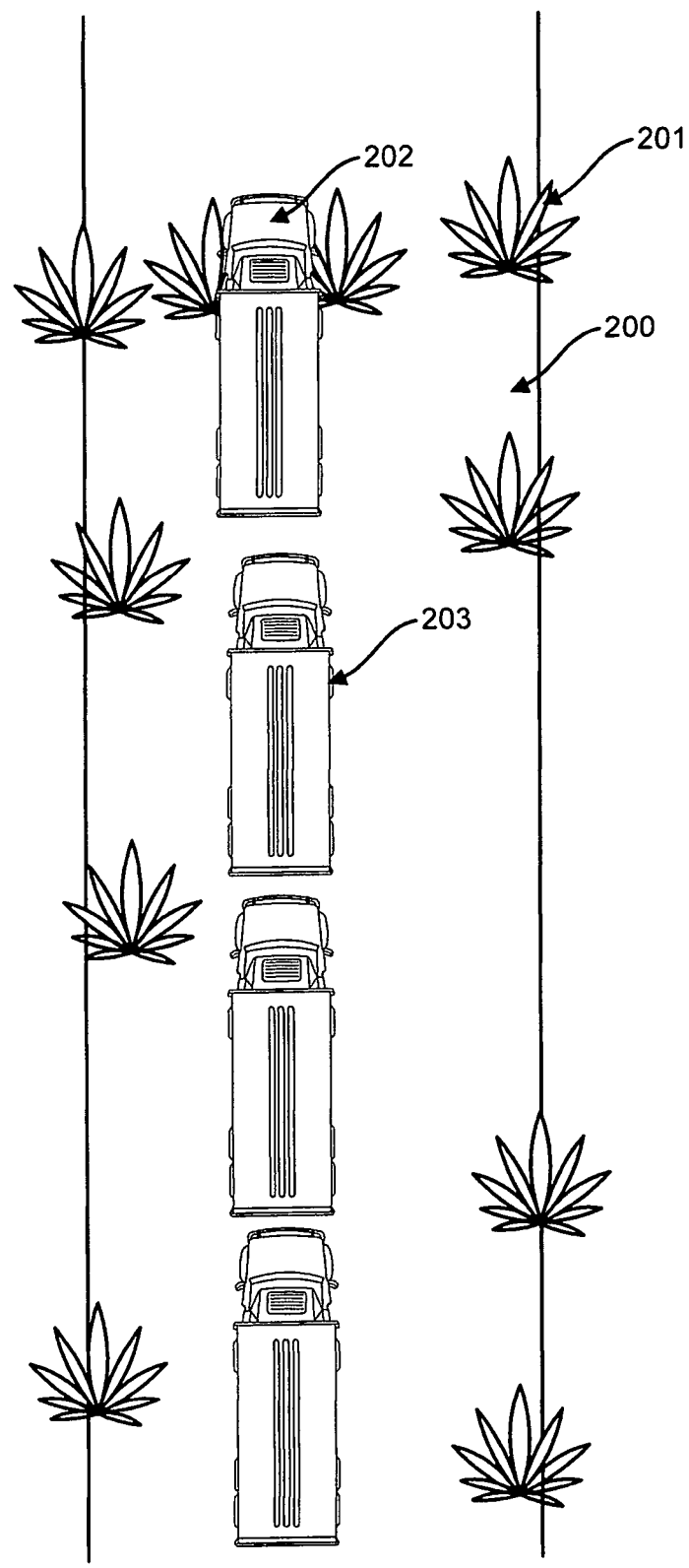
FIG. 2. A lead autonomous vehicle (202) and a following autonomous vehicle (203) traversing through "deformable" terrain such as weeds (201) in the road network (200).

The sensing of the terrain by the lead autonomous vehicle and the following autonomous vehicles are almost identical. "Deformable" obstacles are those that are driven over by the lead autonomous vehicle and are re-found by the following autonomous vehicles. "Deformable" obstacles include dirt and mud while "deformable" terrain include weeds, vegetation, and tree limbs as can be seen in FIGS. 1 and 2. FIG. 1 shows the lead autonomous vehicle and following autonomous vehicle traversing tree limbs while FIG. 2 shows the lead autonomous vehicle and the following autonomous vehicles traversing weeds.

The lead autonomous vehicle records the distance to the 3D obstacles and whether it drove through them. The following autonomous vehicles then classifies differently the "obstacles" that were driven through by the lead autonomous vehicle and allow the planner to drive through them.

This behavior will significantly improve the behavior of the autonomous convoy in the presence of vegetation in the road or by the side of the road such as trails and narrow unimproved road and even cross-country roads.

Figure 3:
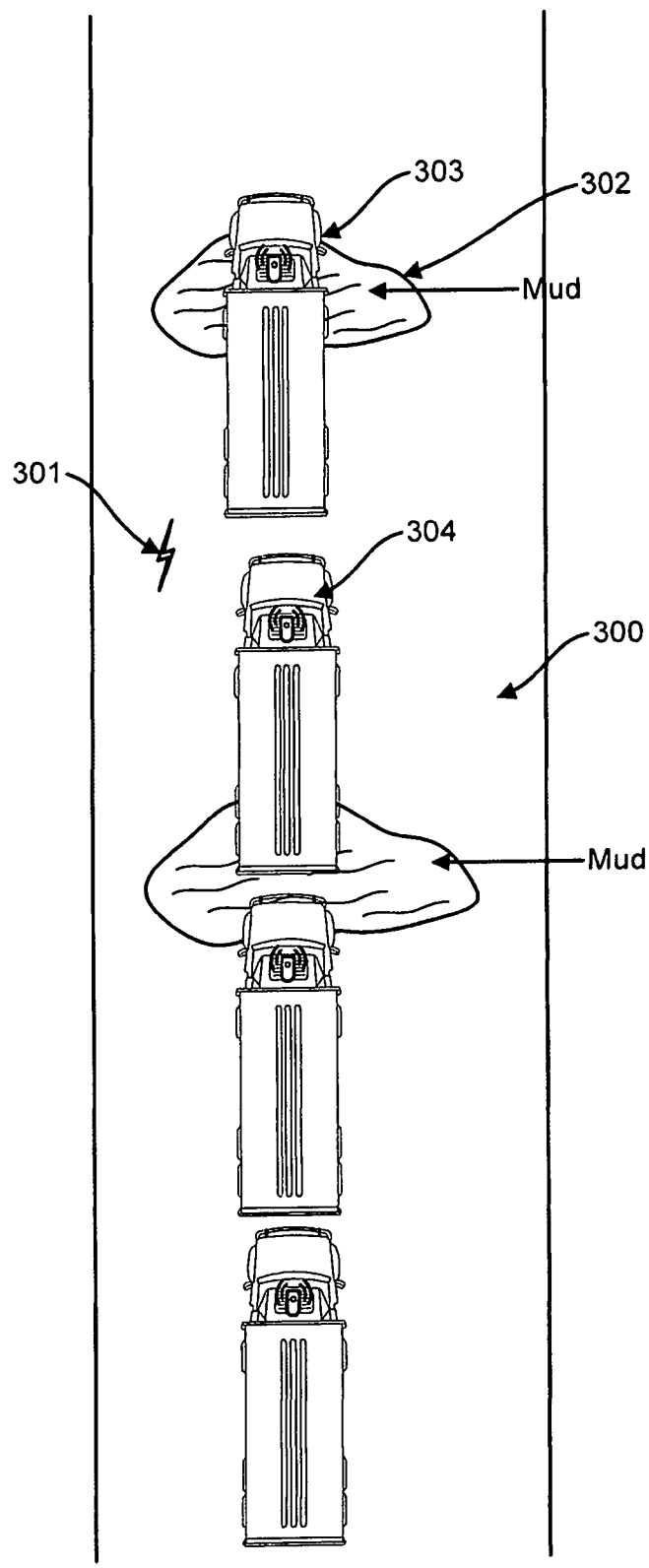
FIG. 3. A lead autonomous vehicle (303) traversing through a "deformable" obstacle such as mud (302) and the communication signals between the lead autonomous vehicle (303) and the following autonomous vehicle (304) to follow the leader across the "deformable" obstacle in the road network (300). There is a communication mechanism (301) that exists between the lead autonomous vehicle (303) and the following autonomous vehicle (304).

There is a communication mechanism between the lead autonomous vehicle and the following autonomous vehicles which enables the following autonomous vehicles to continue onwards the path of the lead autonomous vehicle across the "deformable" obstacle such as mud as can be seen in FIG. 3.

In areas where the terrain is "deformable", errors in wheel odometry is recorded by the lead autonomous vehicle and the following autonomous vehicles are informed that that similar problems are encountered. These errors are sensed by discrepancies between the odometry and the inertial and visual odometry. The behavior in the following autonomous vehicles may preclude them from creating accelerations that may slip as experienced by the lead autonomous vehicle.

The "deformable obstacles" are a new kind of obstacles which are differentiated by other obstacles due to the fact that the lead autonomous vehicle drove through it. These special obstacles are shared between the lead autonomous vehicle and following autonomous vehicles and a different much lower cost is assigned to traversing them. The planner uses these lower costs and plans trajectories through the deformable obstacles if needed.

A method for sharing navigation errors due to terrain slippage is shared between the lead autonomous vehicle and the following autonomous vehicle. The information gained will be used to feed forward the predicted odometry errors of the followers and improve overall localization.

Figure 4:
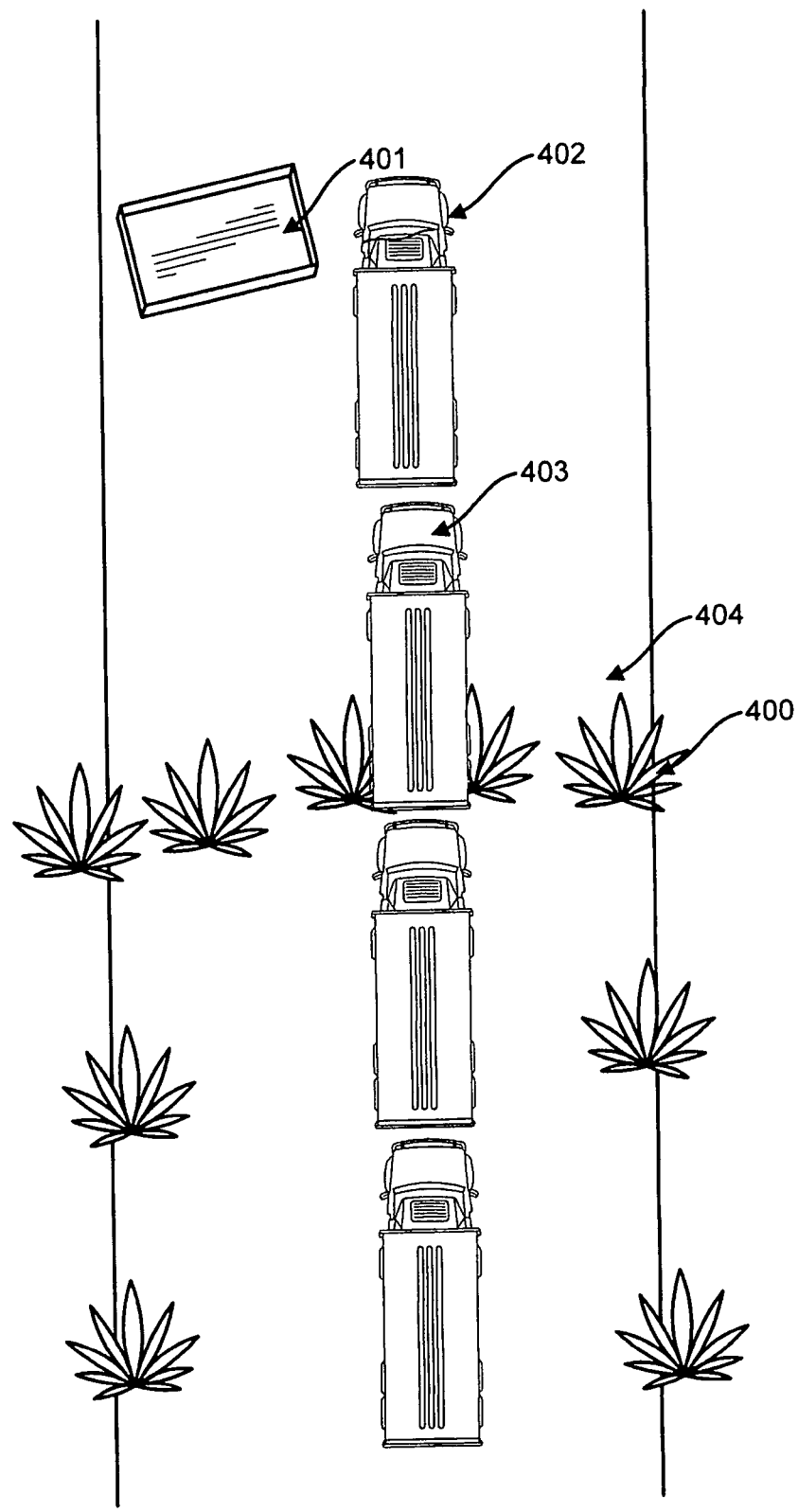
FIG. 4. A lead autonomous vehicle (402) traversing through a "deformable" terrain such as weeds (400) and then avoiding the new obstacle, which in this case is a crate (401)

FIG. 4 illustrates the lead autonomous vehicle travelling through a "deformable" terrain such as weeds and then encountering a new non-deformable obstacle in its path that must be avoided during the navigation. In this case, the following autonomous vehicles behind the lead autonomous vehicle pass through the "deformable" terrain and follow the path of the leader in which the non-deformable obstacle is avoided.

The following autonomous vehicles travel across the "deformable" terrain and "deformable" obstacles at a speed that is set by the lead autonomous vehicle.

The embodiments of the invention in which an exclusive property or privilege is claimed are defined as follows:

1. A system for traversing deformable terrain or obstacles, the system comprising:
    a plurality of autonomous vehicles in a convoy, each autonomous vehicle comprising:
        a sensor operable to sense terrain or obstacles in an environment to be traversed by the autonomous vehicle;
        a wheel odometer operable to measure distance traversed by the autonomous vehicle based on rotation of a wheel of the autonomous vehicle;
        a communication mechanism operable to transmit one or more signals between the autonomous vehicle and other autonomous vehicles in the convoy; and
        a processor,
    wherein the processor of a lead autonomous vehicle in the convoy is operable to execute stored instructions to:
        classify, based on one or more signals from the sensor, a sensed terrain or a sensed obstacle as deformable;
        plan a route for the lead autonomous vehicle that traverses the terrain or obstacle classified as deformable;
        determine an error for the wheel odometer resulting from the traversing the terrain or obstacle classified as deformable; and
        send, via the communication mechanism to a following autonomous vehicle in the convoy, one or more communication signals indicating (i) the terrain or obstacle classified as deformable and (ii) the determined error for the wheel odometer; and
    wherein the terrain or obstacle classified as deformable comprises ground vegetation, tree limbs, dirt, mud, or any combination thereof.

2. The system of claim 1, wherein:
    the one or more communication signals further indicate the route planned for the lead autonomous vehicle; and
    the processor of a following autonomous vehicle in the convoy is operable to execute stored instructions to:
        receive, via the communication mechanism, the one or more communication signals from the lead autonomous vehicle; and
        plan, based on the route planned for the lead autonomous vehicle, a route for the following autonomous vehicle that traverses the terrain or obstacle classified as deformable by the lead autonomous vehicle.

3. The system of claim 1, wherein the processor of a following autonomous vehicle in the convoy is operable to execute stored instructions to:

receive, via the communication mechanism, the one or more communication signals from the lead autonomous vehicle; and adjust, based on the error determined by the lead autonomous vehicle, a measurement by the wheel odometer to compensate for an error expected to result from traversing the terrain or obstacle classified as deformable.

4. The system of claim 1, wherein:

the lead autonomous vehicle in the convoy further comprises a secondary odometer operable to measure distance traversed using inertial and visual measurements; and the processor of the lead autonomous vehicle is further operable to execute stored instructions to determine the error for the wheel odometer based on a discrepancy between a measurement by the wheel odometer and a measurement by the secondary odometer.

5. The system of claim 2, wherein the processor of the following autonomous vehicle is further operable to execute stored instructions to preclude the following autonomous vehicle from accelerating during the traversing of the terrain or obstacle classified as deformable by the lead autonomous vehicle.

6. The system of claim 1, wherein the processor of the lead autonomous vehicle is further operable to execute stored instructions to plan the route by:

assigning respective costs to traversing sensed features in the environment, including the terrain or obstacle classified as deformable; and determining, based on the assigned costs, a route through the environment.

* * * * *